(12) United States Patent
Zumberger et al.

(10) Patent No.: US 11,484,895 B2
(45) Date of Patent: Nov. 1, 2022

(54) LINER AND ROTARY TANK ASSEMBLY THEREFOR

(71) Applicant: Stolle Machinery Company, LLC, Centennial, CO (US)

(72) Inventors: Neil Albert Zumberger, Sidney, OH (US); Steven Todd Albright, Piqua, OH (US); Dennis Cornelius Stammen, Brookville, OH (US); Bryan Lee Schoenlein, Minster, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 24 days.

(21) Appl. No.: 17/167,542

(22) Filed: Feb. 4, 2021

(65) Prior Publication Data
US 2022/0241802 A1    Aug. 4, 2022

(51) Int. Cl.
| *B05B 3/02* | (2006.01) |
| *B65B 3/04* | (2006.01) |
| *B67C 3/28* | (2006.01) |
| *B05B 13/04* | (2006.01) |
| *B05C 5/02* | (2006.01) |
| *B21D 51/46* | (2006.01) |

(52) U.S. Cl.
CPC ............ *B05B 3/02* (2013.01); *B05B 13/0447* (2013.01); *B65B 3/04* (2013.01); *B67C 3/285* (2013.01); *B05C 5/0208* (2013.01); *B21D 51/46* (2013.01); *B65G 2201/0252* (2013.01); *Y10S 118/03* (2013.01)

(58) Field of Classification Search
CPC ....... B05B 3/02; B05B 13/0447; B05C 5/022; B05C 5/0204; B05C 5/0208; B05C 11/101; B05C 11/1044; B05C 13/025; Y10S 118/03; B29C 70/80; B21D 51/46; B65B 3/04; B67C 3/285; B65G 2201/0252
USPC .................. 118/712, 694, 313, 319, 320
See application file for complete search history.

(56) References Cited

U.S. PATENT DOCUMENTS

| 4,840,138 A | 6/1989 | Stirbis |
| 5,119,676 A | 6/1992 | Bower et al. |
| 5,215,587 A | 6/1993 | McConnellogue et al. |
| 5,476,362 A | 12/1995 | Kobak et al. |
| 5,564,877 A | 10/1996 | Hamilton |
| 5,680,960 A | 10/1997 | Keyes et al. |
| 5,947,337 A | 9/1999 | Worth |
| 6,343,496 B1 | 2/2002 | Hanna et al. |

(Continued)

OTHER PUBLICATIONS

U.S. Patent and Trademark Office, PCT Application No. PCT/US22/70056 International Search Report and Written Opinion, dated Mar. 28, 2022, 12 pages.

*Primary Examiner* — Laura Edwards
(74) *Attorney, Agent, or Firm* — Eckert Seamans Cherin & Mellott, LLC

(57) ABSTRACT

A rotary tank assembly is provided for a liner. The liner is structured to apply a compound to a plurality of container closures. The rotary tank assembly includes a compound tank, a fill tube structured to fill the tank with a volume of the compound to a desired level, a sensor assembly adapted to measure the level of the compound within the compound tank, and a rotary union assembly structured to pivotably couple the fill tube and the sensor assembly to the compound tank. The sensor assembly only requires one single probe.

16 Claims, 7 Drawing Sheets

(56) References Cited

U.S. PATENT DOCUMENTS

| | | | |
|---|---|---|---|
| 8,386,072 B1* | 2/2013 | Mihalik | B67C 3/026 |
| | | | 700/239 |
| 8,826,850 B2 | 9/2014 | Zumberger et al. | |
| 2010/0209604 A1 | 8/2010 | Stammen | |
| 2019/0271580 A1 | 9/2019 | Sheridan | |

* cited by examiner

LINER AND ROTARY TANK ASSEMBLY THEREFOR

BACKGROUND

Field

The disclosed concept relates generally to machinery for container closures and, more particularly, to liners for applying a coating material to container closures such as, for example, can ends. The disclosed concept also relates to tank assemblies for liners.

Background Information

It is known to apply sealant material, commonly referred to as compound, to the underside of container closures, for example, to facilitate subsequent sealing attachment (e.g., without limitation, seaming) of the closures to containers such as, for example, beer/beverage and food cans.

A rotary liner machine, for example, is used to line (i.e., apply sealant or compound) to container closures, commonly referred to as can lids, shells or can ends, at relatively high speed in relatively high volume applications. The rotary liner generally includes a base having a chuck assembly. A pivotal upper turret assembly is disposed over the chuck assembly and includes an electrical tank assembly, a rotary compound tank assembly, and a number of peripherally disposed fluid dispensing apparatus (e.g., sealant or compound guns). A lower turret assembly rotates the chucks. A downstacker delivers the can ends to a star wheel which, in turn, cooperates with corresponding chuck members of the chuck assembly to support and rotate the can ends relative to the fluid dispensing apparatus.

Specifically, the star wheel rotates the can ends onto the chuck members, which are raised by cams to receive the can ends. The chuck members then begin to rotate the can ends, which is commonly referred to as "pre-spin." Once the can ends reach the desired rotational velocity, the sealant is applied (e.g., without limitation, sprayed onto) to the can ends by the fluid dispensing apparatus. This is commonly referred to as the "spray time." After the sealant is applied, the can ends continue to be rotated for a relatively brief period of time to smooth out the sealant. This is commonly referred to as the "post spin time." Finally, the cams lower the chuck members and can ends, and each can end is removed and discharged from the rotary liner via an unloading guide.

Among other disadvantages, conventional rotary liner designs suffer from speed limitations, and operating and maintenance issues associated with the rotary tank and, in particular, with the sensor assembly used to measure the level of compound within the tank. More specifically, the compound enters the tank via a fill valve that is opened and closed based upon signals received from a plurality of level sensing probes. The sensor assembly typically includes three level sensors (i.e., sensing probes): a low level sensor for detecting an "empty" reading, a middle level sensor for measuring a "full" or "high level" reading, and an upper level sensor for detecting an "overflow" reading. The low level sensor is generally always submersed in the compound. Over time, the compound dries in the tank and can create "bridges" between the level sensors (i.e., consolidated collections of dried compound that create a connection or "bridge" between the level sensors). Such "bridges" create an electrical current pathway for electrical current to pass from sensor probe to sensor probe, thereby adversely affecting the signal and associated reading. Consequently, the liner machine must be stopped and the tank assembly must be disassembled, cleaned, and reassembled in order to restore proper operation.

Additionally, as the tank assembly rotates (e.g., about 180-262.5 rpm), the compound is impacted by the induced centrifugal force, which causes it to flow outward toward the walls of the tank such that the compound rises up the wall on the exterior of the tank having a higher level at that location versus the center of the tank. This makes it difficult to consistently measure the level of compound within the tank. Attempts have, been made to address this problem using a mechanical insert to arrest the flow of the compound as it progresses up the wall of the outside of the tank. Such inserts are not without their own set of unique disadvantages, and all of the foregoing issues worsen as the rotational speed of the tank is increased.

There is, therefore, room for improvement in liners and in tank assemblies for liners.

SUMMARY

These needs and others are met by embodiments of the disclosed concept, which are directed to a liner and tank assembly therefor. Among other advantages, the tank assembly provides reliable operation and allows the liner to operate at greater speeds and increased production volumes.

As one aspect of the disclosed concept, a rotary tank assembly is provided for a liner structured to apply a compound to a plurality of container closures. The rotary tank assembly comprises: a compound tank, a fill tube structured to fill the tank with a volume of said compound to a desired level; a sensor assembly adapted to measure the level of said compound within the compound tank; and a rotary union assembly structured to pivotally couple the fill tube and the sensor assembly to the compound tank. The sensor assembly only requires one single probe.

The compound tank may comprise a generally cylindrical body including a first end, a second end disposed opposite and distal from the first end, an interior having an inner diameter, and a height defined by the distance between the first end and the second end. The inner diameter of compound tank may be less than 5.125 inches.

The single probe may be a guide pulse level sensor. The sensor assembly may include a quick connector for electrically connecting and disconnecting the one single probe.

A liner including the aforementioned rotary tank assembly is also disclosed.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
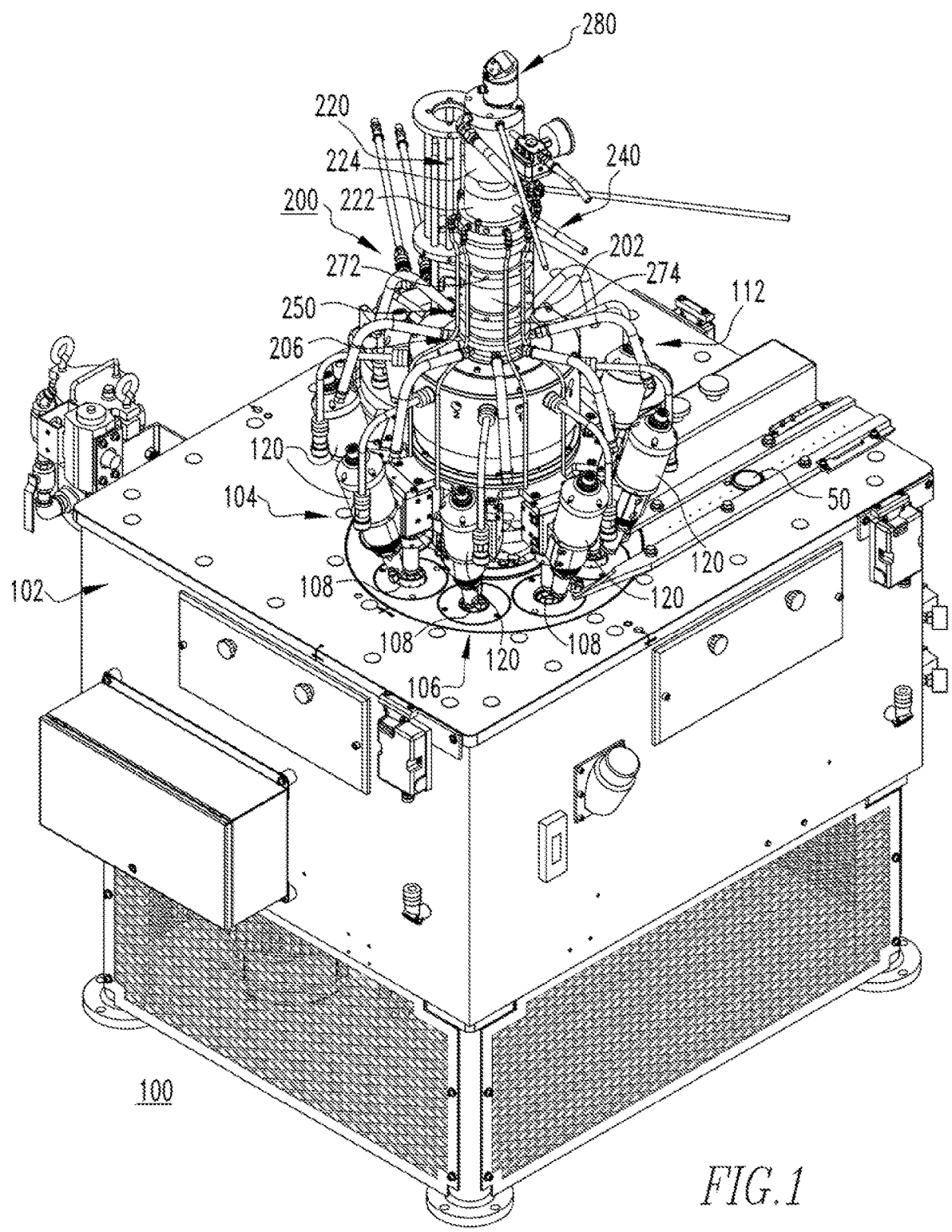
FIG. 1 is an isometric view of a liner and tank assembly therefor in accordance with an embodiment of the disclosed concept.

It will be appreciated that although a tank assembly in accordance with the disclosed concept is shown and described herein as used with respect to a rotary liner for applying a sealant or compound to container closures, it could alternatively be employed to convey container closures with a wide variety of other types of equipment and machines (not shown) in other applications.

Directional phrases used herein, such as, for example, up, down, clockwise, counterclockwise and derivatives thereof, relate to the orientation of the elements shown in the drawings and are not limiting upon the claims unless expressly recited therein.

The specific elements illustrated in the drawings and described herein are simply exemplary embodiments of the disclosed concept. Accordingly, specific dimensions, orientations and other physical characteristics related to the embodiments disclosed herein are not to be considered limiting on the scope of the disclosed concept.

As employed herein, the terms "container closure," "can end," "shell," and/or "lid" are generally synonymous and are used substantially interchangeably to refer to any known or suitable closure member that is applied to (e.g., with limitation, seamed to) the open end of a container (e.g., without limitation, beer/beverage can; food can) to seal the contents of the container therein.

As employed herein, the terms "sealant" and/or "compound" are generally synonymous and are used substantially interchangeably to refer to any known or suitable coating that is applied to (e.g., with limitation, sprayed onto) the surface of a container closure.

As employed herein, the term "production volume" refers to the output of the liner and is preferably measured in container closures per minute, more commonly referred to in the industry as "ends per minute" (epm).

As employed herein, the statement that two or more parts are "coupled" together shall mean that the parts are joined together either directly or joined through one or more intermediate parts.

As employed herein, the term "number" shall mean one or an integer greater than one (i.e., a plurality).

A liner machine 100, such as for example and without limitation, the rotary liner machine 100 shown in FIG. 1, is used for lining (i.e., applying sealant (not shown) or compound (not shown)) to can ends 50. The liner machine 100, commonly referred to simply as a "liner," employs a rotary tank assembly 200 (best shown in FIGS. 4-8) in accordance with an embodiment of the disclosed concept.

As shown in FIG. 1, the liner 100 generally includes a base 102 having a processing assembly 104. The processing assembly 104 includes a chuck assembly 106 having a number of rotatable chucks 108, and a pivotal upper turret assembly 110 disposed over the chuck assembly 106. The pivotal upper turret assembly 110 includes an electrical tank assembly 112, the aforementioned rotary tank assembly 200, and a number of peripherally disposed fluid dispensing apparatus 120 (e.g., sealant or compound guns). A lower turret assembly (not shown) is disposed within the base 102 and is configured to rotate the chucks 108. The example liner 100 includes eight (8) guns 120 with each gun 120 being associated with a corresponding, rotatable chuck 108 of the chuck assembly 106. It will be appreciated, however, that any suitable alternative number and configuration (not shown) of chucks 108 and guns 120 or other fluid dispensing apparatus (not shown) could be employed without departing from the scope of the disclosed concept. It will also be appreciated that the processing assembly 104 may, for example and without limitation, include the structure and features of that disclosed in commonly owned U.S. Pat. No. 11,254,517, the contents of which are incorporated herein by reference as if filly set forth herein.

Figure 3:
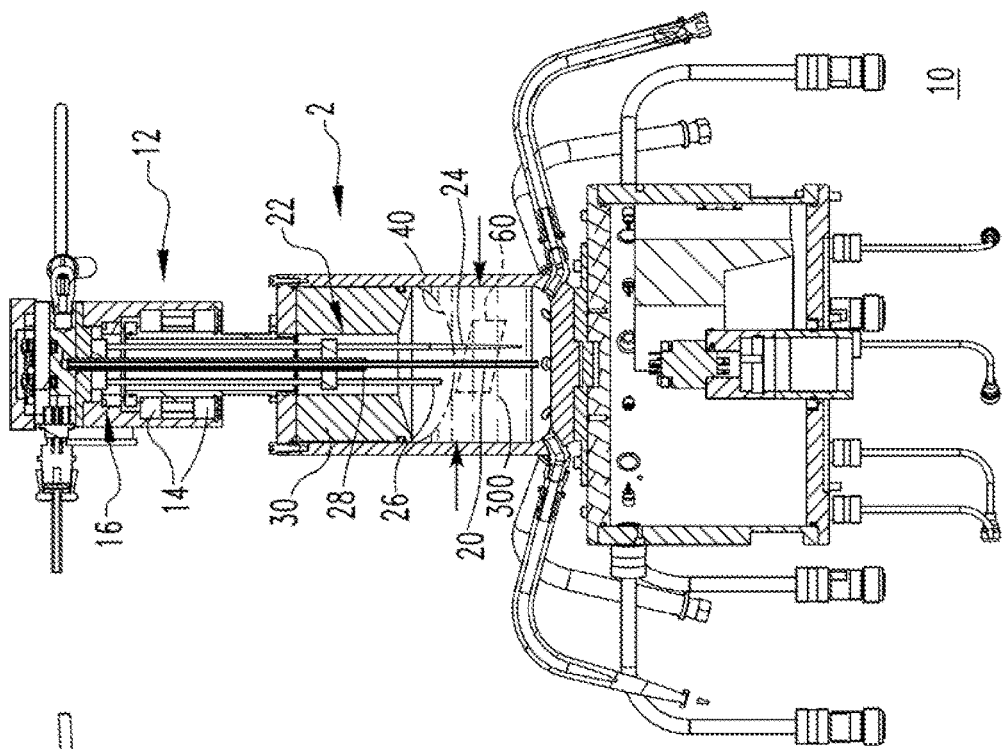
FIG. 3 is a section view taken along line 3-3 of FIG. 2.
Figure 2:
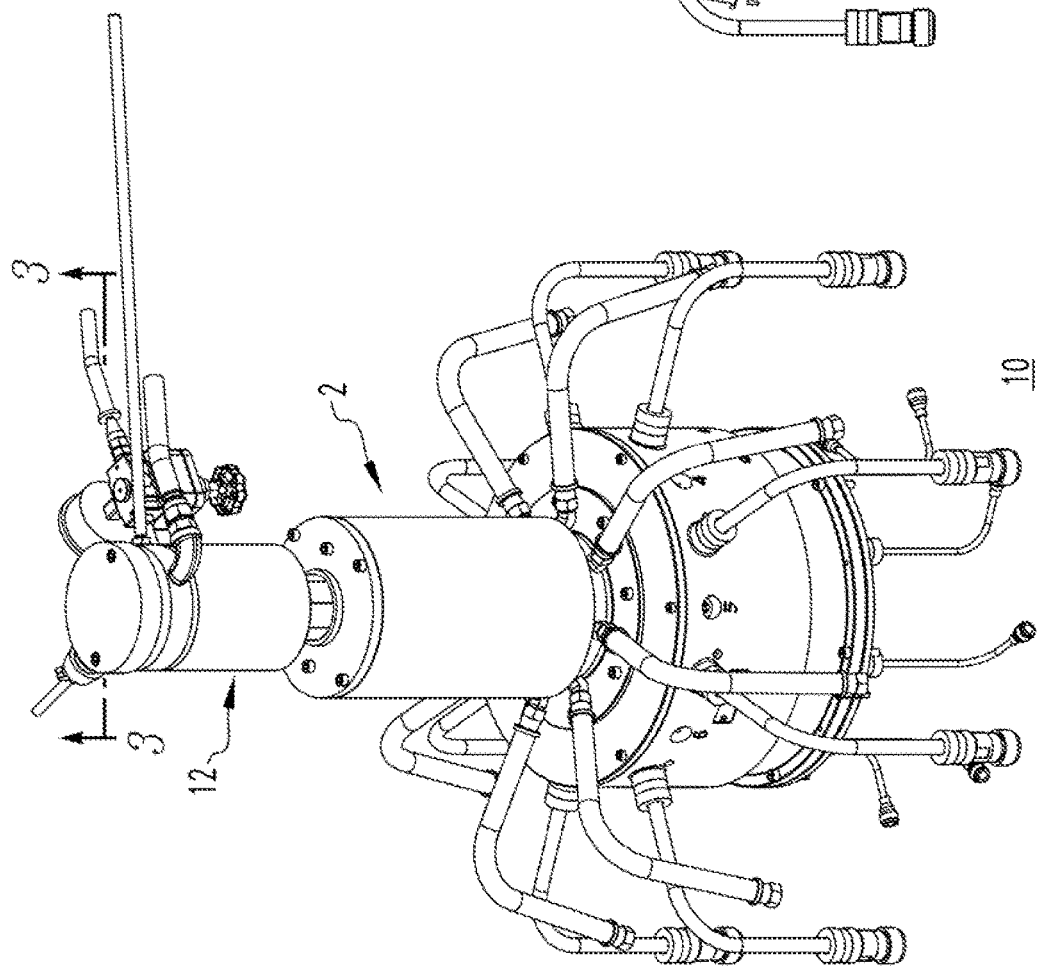
FIG. 2 is an isometric view of a conventional tank assembly provided solely for purposes of comparison to the disclosed tank assembly.

An upper turret assembly 10 employing a conventional tank assembly 2 is shown in FIGS. 2 and 3 for purposes of illustration and comparison to the tank assembly 200 of the disclosed concept. The upper turret assembly 10 includes a rotary union 12 having internal bearings 14 and a seal 16, and the tank assembly 2 includes a fill tube 20, a sensor assembly 22 having a plurality of sensors (i.e., level probes) 24, 26, 28, and a fill insert 30, all of which are best shown in the section view of FIG. 3. Three separate level probes 24, 26, 28 (e.g., low level sensor 24, middle level sensor 26, upper level sensor 28) are required, and along with the fill tube 20, can result in "bridging" of the compound 40 (shown in simplified form in phantom line drawing in FIG. 3) among the probes 24, 26, 28. That is, compound 40 can lump together and connect or "bridge" together a number of the probes 24, 26, 28 and/or the fill tube 20 as illustrated by way of example with the schematic representation 60 shown in phantom line drawing in simplified form in FIG. 3. As noted above, such bridging can result in undesired electrical communication and malfunction or error in operating accuracy of the probes 24, 26, 28.

Also shown in FIG. 3 is the fact that the compound 40 is susceptible to centrifugal force as the tank assembly 2 rotates at relatively high speed (e.g., between about 180-262.5 rpm). That is, the compound 40 tends to be forced outward by the centrifugal force against the radial constraint of the interior sidewalls of the tank assembly where it tends to climb the interior sidewalls forming a concave surface profile, as shown. This makes it difficult to accurately measure the actual level of compound 40. This problem is exacerbated by a number of issues, including the diameter of the tank, d, being relatively large, and the speed of rotation of the tank being relatively high. The diameter, d, of the tank in the example of FIGS. 2 and 3 is 5.125 inches. The aforementioned fill insert 30 is employed to attempt to address and minimize such issues. However, it will be appreciated that the fill insert 30 has limited effectiveness and also suffers from the disadvantage of occupying valuable volume within the tank assembly 2, as shown in FIG. 1.

As will now be described in great detail with respect to FIGS. 1 and 4-8, the disclosed rotary tank assembly 200 is uniquely designed to address and overcome the foregoing problems.

Figure 4:
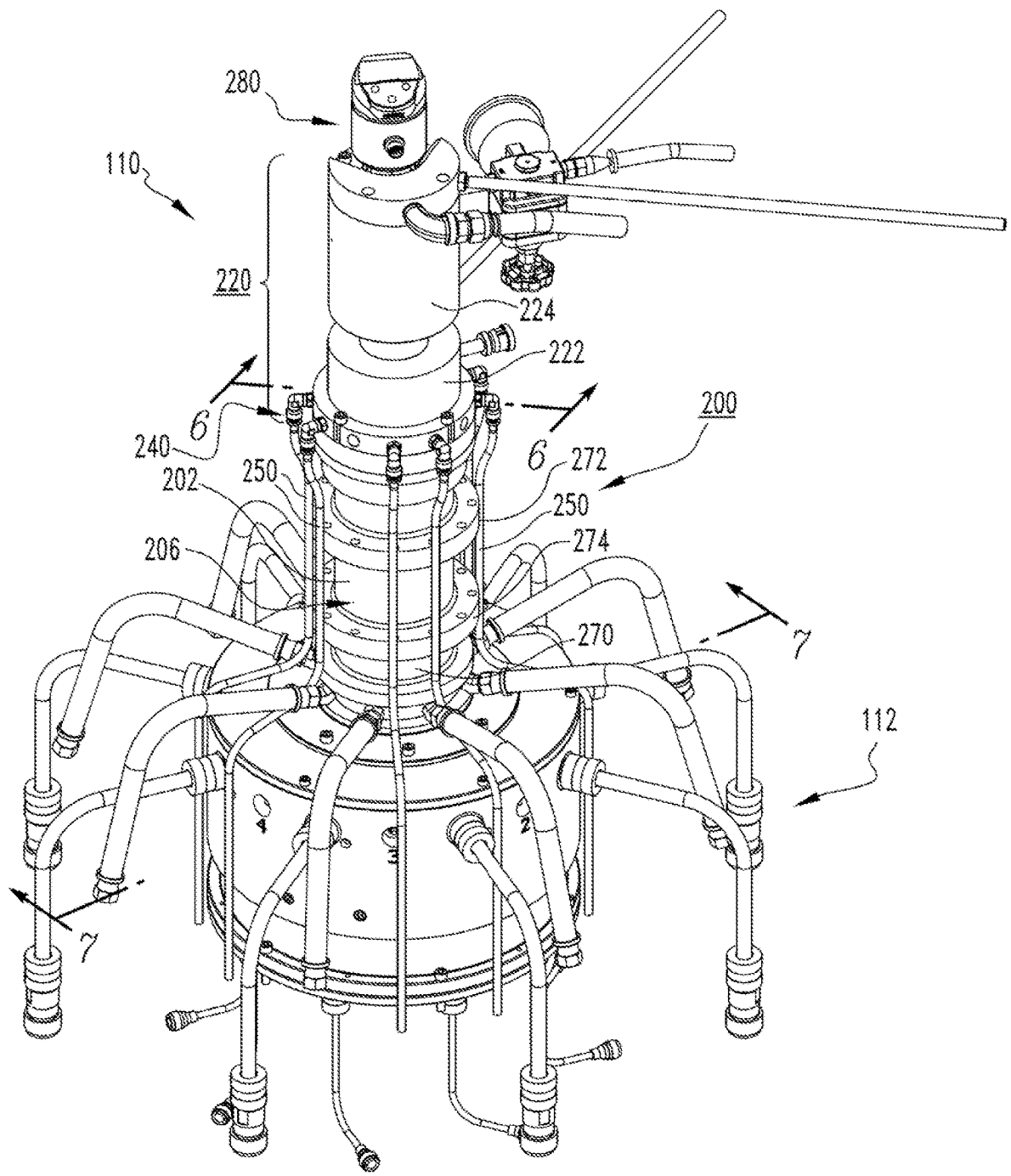
FIG. 4 is an isometric view of a tank assembly in accordance with an embodiment of the disclosed concept.
Figure 5:
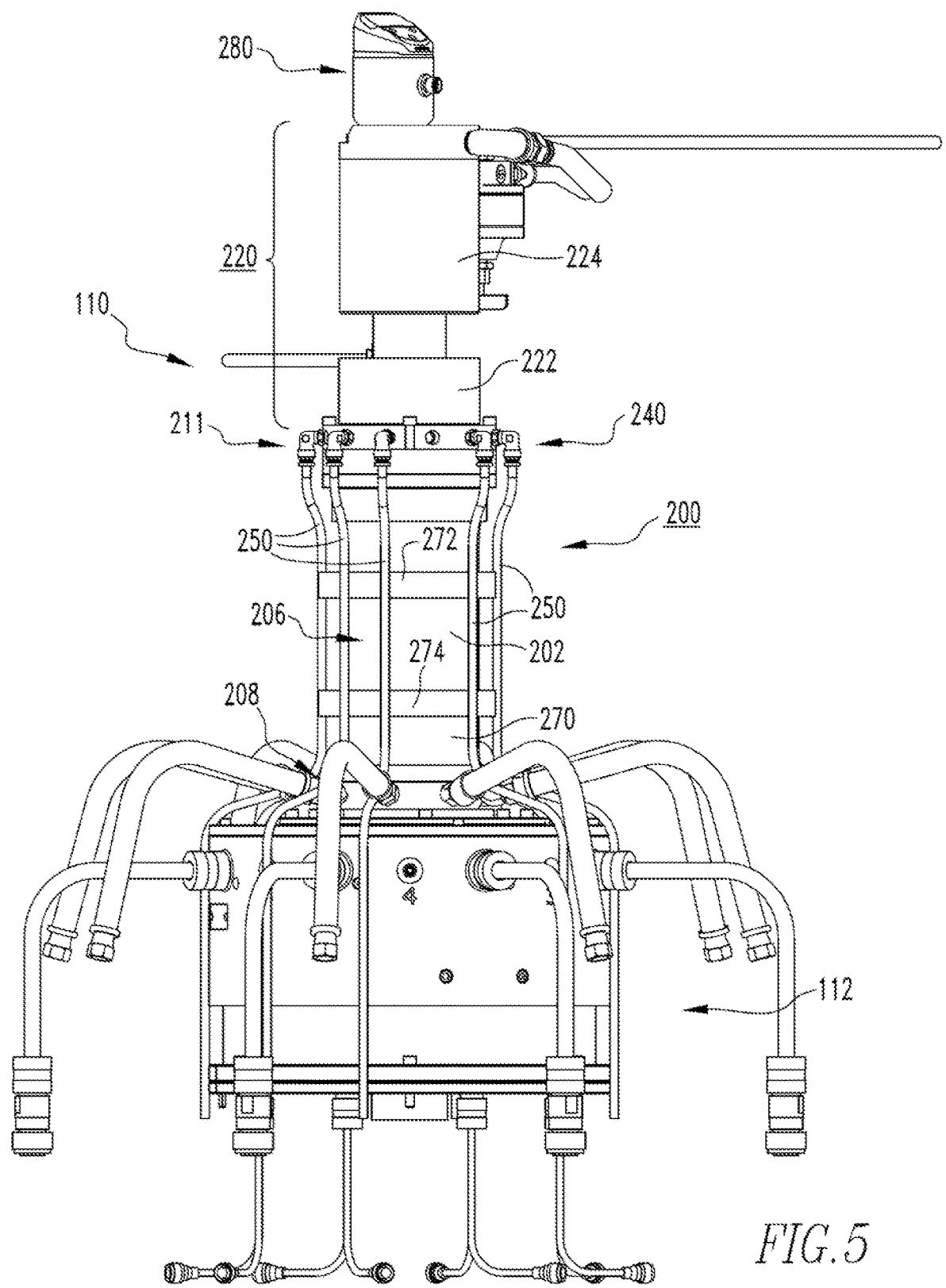
FIG. 5 is a side elevation view of the tank assembly of FIG. 4.
Figure 6:
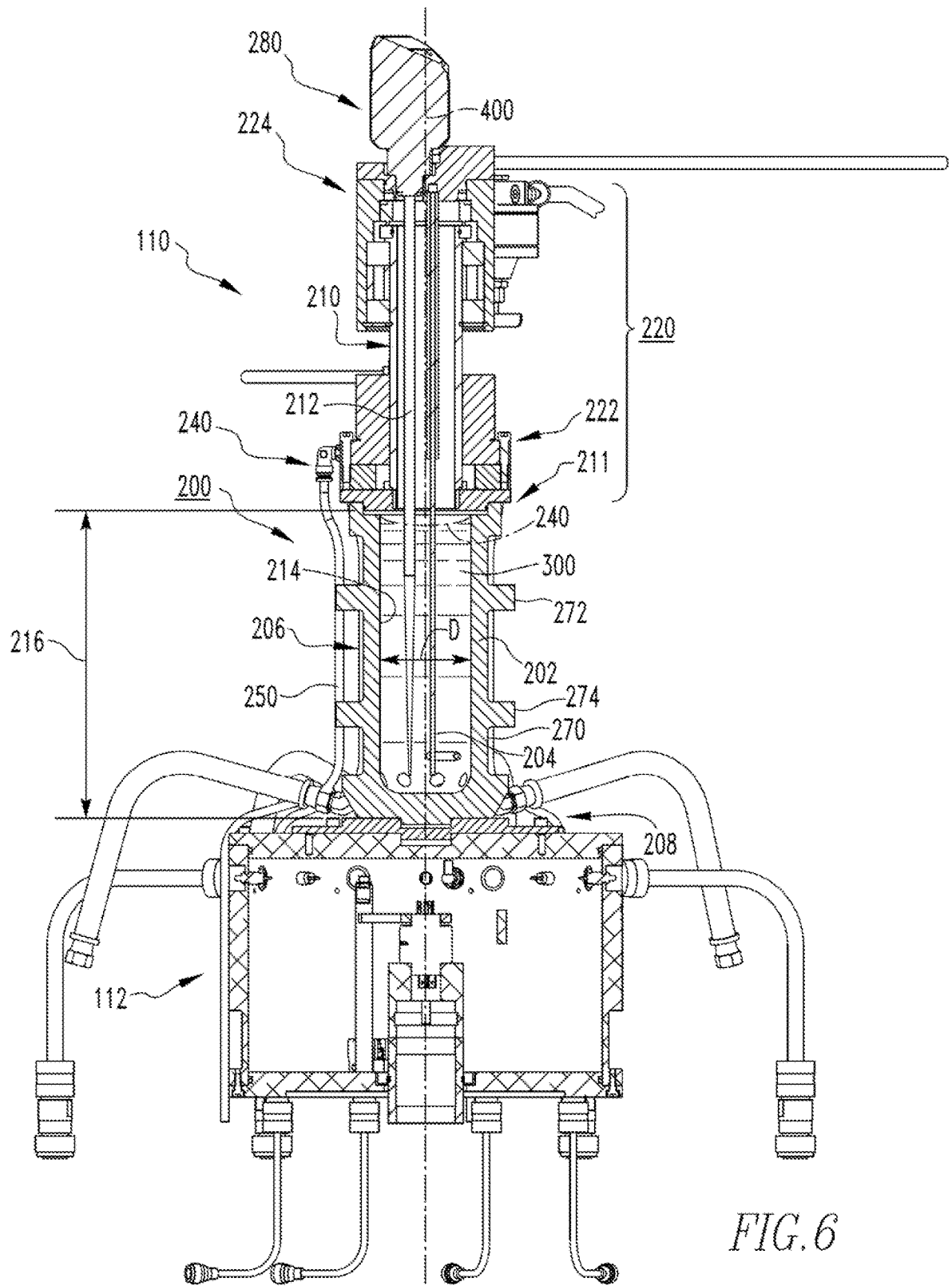
FIG. 6 is a section view taken along line 6-6 of FIG. 4.
Figure 7:
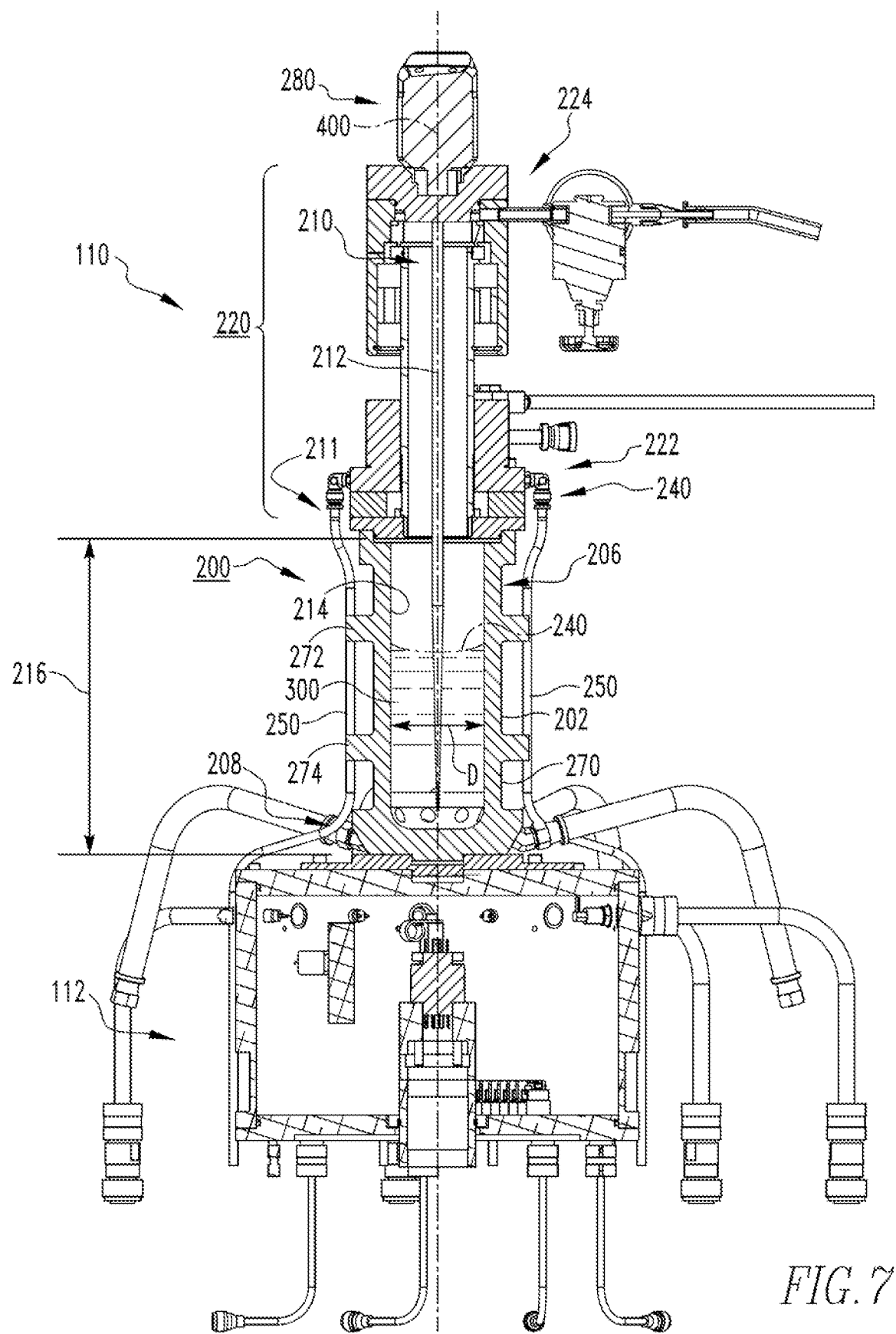
FIG. 7 is a section view taken along line of FIG. 4.

As shown in FIGS. 4 and 5, as well as the section views of FIGS. 6 and 7, the rotary tank assembly 200 preferably includes a compound tank 202, a fill tube 204 structured to fill the compound tank 202 with a volume of compound 300 (shown in simplified form in FIGS. 6 and 7) to a desired level, a sensor assembly 210 adapted to measure the level of the compound 300 within the compound tank 202, and a rotary union assembly 220. The rotary union assembly 220 is structured to pivotably couple the fill tube 204 and the sensor assembly 210 to the compound tank 202, as best shown in the section views of FIGS. 6 and 7 (see also, the exploded view of FIG. 8).

Figure 8:
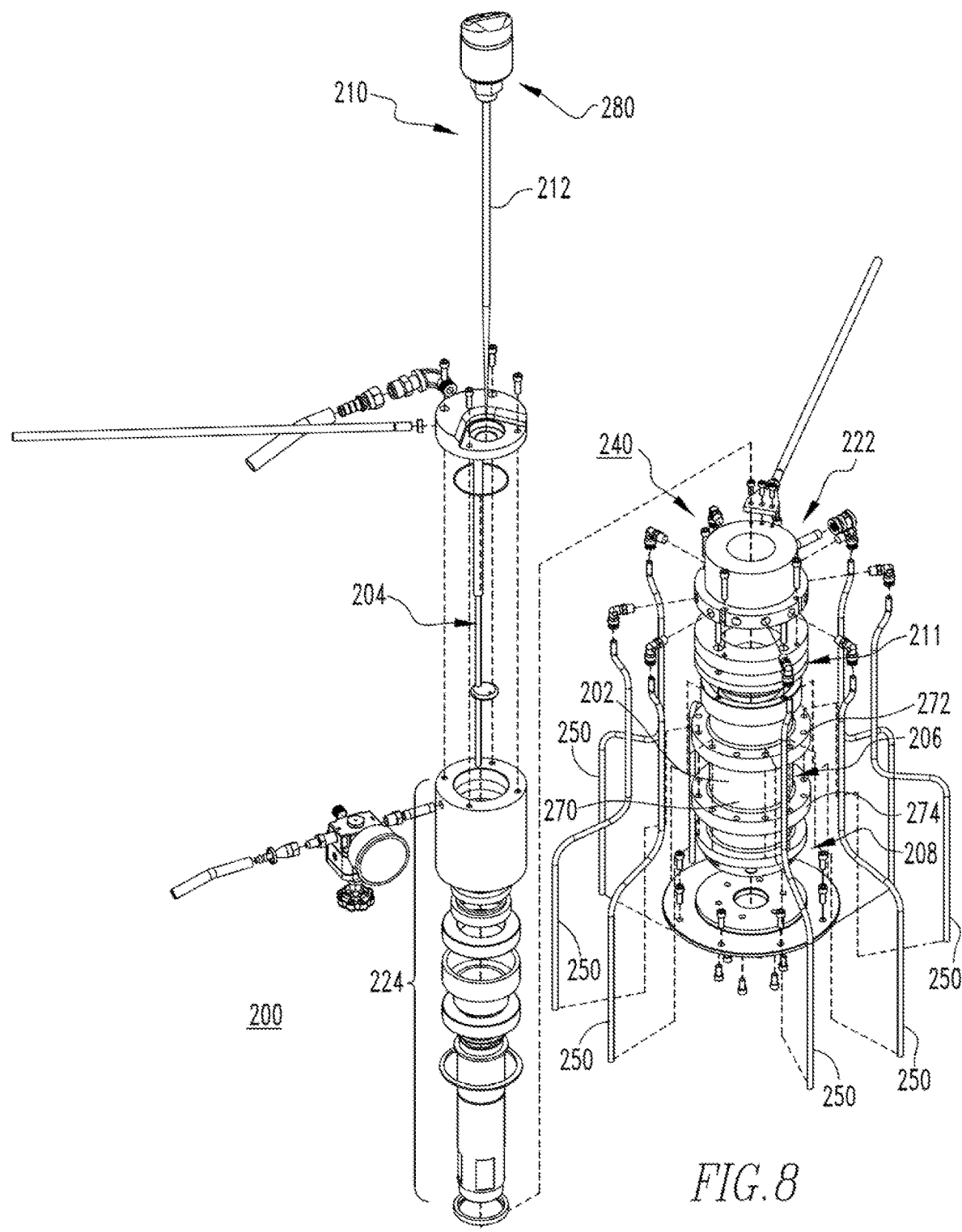
FIG. 8 is an exploded isometric view of the tank assembly.

Among other unique features, the sensor assembly 210 of the rotary tank assembly 200 only requires, and in fact only uses, one single probe 212, as best shown in FIGS. 6-8. As discussed hereinabove with respect to FIGS. 2 and 3, conventional tank assemblies 2 and sensor assemblies 22 therefor require a plurality (e.g., three, or more) of sensing probes 24, 26, 28, which results in a variety of problems, including without limitation, the aforementioned difficulty of compound build up and "bridging" of compound among the probes (see compound bridge 60 shown in simplified form in FIG. 3) causing malfunction, or operating errors. It also requires maintenance and, more specifically, to stop operation of the machine, disassemble the machine, and remove the compound bridge 60 in order to restore proper function of the sensing assembly 22.

The exemplary single probe 212 is a guide pulse level sensor, which utilizes guide pulse technology for maintenance free operation. That is, the single probe 212 is resistant to issues such as, for example and without limitation, foaming, fluid buildup due to curing, obstacles in the tank 202, condensation, changes in fluid properties, and ripples. Accordingly, the disclosed sensor assembly 210 provides less complexity while also allowing for more reliable operation. Preferably, the single probe 212 and fill tube 204 are mounted in an equidistant fashion from the axis of rotation 400, as best shown in the section views of FIGS. 6 and 7. This is done to limit the applied force to the individual members of the assembly, as well as to minimize, or eliminate, foaming. In addition to the foregoing advantages, the exemplary guide pulse level sensor 212 also offers the advantage of providing continuous compound level readings. The aforementioned conventional sensing probes 24, 26, 28, on the other hand, only offer discrete sensing capability (e.g., low level; high level; emergency shut off). Accordingly, the disclosed sensor assembly 210 and single probe 212 thereof offer improved performance to more accurately and consistently measure the level of compound 300 within the compound tank 202.

Continuing to refer to FIGS. 6 and 7, it will be appreciated that the compound tank 202 comprises a generally cylindrical body 206 including first end 208, a second end 211 disposed opposite and distal from the first end 208, an interior 214 having an inner diameter, D, and a height 216 defined by the distance between the first end 208 and the second end 211. The inner diameter, D, is less than 5.125 inches and, preferably, is about 2.750 inches. It will be appreciated that this is relatively significantly smaller than the diameter, d (FIG. 3), of the conventional compound tank 2 (FIGS. 2 and 3). Among other advantages, the smaller inner diameter, D, of the disclosed compound tank 202 is not affected as much by centrifugal forces associated with rotation. This will be appreciated with reference to the surface 240 of compound 300 shown in the section views of FIGS. 6 and 7, which has a significantly less pronounced concave shape compared to the surface 40 of compound 300 in conventional tank 2 of FIG. 3. This is true even for increased rotational velocity (e.g., without limitation, from about 262.5 rpm to about 375 rpm). This less dynamic fluid behavior of the compound 300 within the compound tank 202 is advantageous because it results in more consistent and predictable operation. While it is true that the interior volume available within the interior 214 of the compound tank 202 is reduced, this is offset by the fact a tank insert 30 (FIG. 3) is no longer required. The incoming flow rate of compound 300 via the fill tube 204 is important. Specifically, it is desirable to not fill, or empty, the compound tank 202 over a relatively short period of time. That is, the incoming fluid flow should be slightly higher than the outgoing flow to allow a slow, well-controlled, increase in the fluid level inside the tank during the fill cycle. For purposes of illustration, the fluid level of the compound 300 in FIG. 6 is shown to be full, as compared to FIG. 7 wherein the level of the compound 300 is reduced.

Referring to FIGS. 4-7, and also the exploded view of FIG. 8, it will be appreciated that the rotary union assembly 220 of the disclosed rotary tank assembly 200, preferably, includes a first rotary union 222 and a second rotary union 224. As best shown in the section views of FIGS. 6 and 7, and the exploded view of FIG. 8, at least one of the first rotary union 222 and the second rotary union 224 is an air rotary union. In the example shown, only the first rotary union is an air rotary union 222, and the second rotary union is a mechanical rotary union 224. The rotary tank assembly 200 further includes a compressed air assembly 240 and a plurality of air conduits 250. The air conduits 250 are each coupled to the air rotary union 222 in a radially spaced manner, as best shown in FIG. 8.

In the example shown and described herein, the generally cylindrical body 206 of the compound tank 202 further includes an exterior 270 having a perimeter. A plurality of ribs 272, 274 (two are shown) extend radially around the perimeter. The air conduits 250 are coupled to the air rotary union 222, and are supported by the ribs 272, 274. That is, the ribs 272, 274 are structured to maintain the air conduits 250 in a spaced radial relationship on the exterior 270 of the cylindrical body 206 of the compound tank 202, as shown in FIGS. 4, 5 and 8 (see also the section views of FIGS. 6 and 7).

As best shown in FIG. 8, the sensor assembly 210, preferably, includes a quick connector 280 for relatively quickly and easily electrically connecting and disconnecting the single probe 212. Such quick connector 280, among other advantages, eliminates the requirement for manual wiring of the sensor assembly 210 and, therefore, further simplifies the complexity of the design.

Accordingly, it will be appreciated that the disclosed rotary tank assembly 200 enhances performance of the liner 100 (FIG. 1) compared to prior art tank assemblies 2 (FIGS. 2 and 3). Among other advantages, the single probe 212 of the sensor assembly and the design of the compound tank 202 provide a relatively less complex system yet offers more consistent and reliable operation. The guide pulse level sensor 212 provides continuous compound level readings while avoiding known problems such as compound bridging (see compound bridge 60, shown in simplified form in FIG. 3). The relatively small inner diameter, D, of the compound tank 202 also minimizes adverse fluid dynamics associated with rotation of the tank assembly 200 and of the compound 300 therein, thereby eliminating the need for any tank insert (see, e.g., tank insert 30 of FIG. 3) and also allowing the rotational speed of the tank 202, the speed of operation of the liner 100 in general, to be increased (e.g., without limitation, up to about 375 rpm, or more), thus improving production volume.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A rotary tank assesmbly for a liner, the rotary tank assembly comprising:

a compound tank;

a fill tube structured to fill the tank with a volume of compound to a desired level;

a sensor assembly adapted to measure the level of said compound within the compound tank; and a rotary union assembly structured to pivotably couple the fill tube and the sensor assembly to the compound tank, wherein the sensor assembly only requires one single probe, wherein the compound tank comprises a cylindrical body including a first end, a second end disposed opposite and distal from the first end, an interior having an inner diameter, and a height defined by the distance between the first end and the second end, and wherein the rotary union assembly comprises a first rotary union and a second rotary union.

2. The rotary tank assembly of claim 1 wherein the single probe is a guide pulse level sensor.

3. The rotary tank assembly of claim 1 wherein the inner diameter of compound tank is less than 5.125 inches.

4. The rotary tank assembly of claim 3 wherein the inner diameter of the compound tank is about 2.750 inches.

5. The rotary tank assembly of claim 1 wherein at least one of the first rotary union and the second rotary union is an air rotary union; and wherein the rotary tank assembly further comprises a compressed air assembly including a number of air conduits coupled to the air rotary union.

6. The rotary tank assembly of claim 5 wherein the cylindrical body of the compound tank further includes an exterior having a perimeter, and a plurality of ribs extending radially around the perimeter; wherein the number of air conduits is a plurality of air conduits; and wherein the ribs are structured to maintain the plurality of air conduits in a spaced radial relationship on the exterior of the cylindrical body.

7. The rotary tank assembly of claim 1 wherein the rotary tank assembly is devoid of any tank insert within the interior of the compound tank.

8. The rotary tank assembly of claim 1 wherein the sensor assembly includes a quick connector for electrically connecting and disconnecting the one single probe.

9. A liner comprising:

a base; and a processing assembly operatively coupled to the base, the processing assembly including a rotary tank assembly comprising:

a compound tank, a fill tube structured to fill the tank with a volume of compound to a desired level, a sensor assembly adapted to measure the level of said compound within the compound tank, and a rotary union assembly structured to pivotably couple the fill tube and the sensor assembly to the compound tank, wherein the sensor assembly only requires one single probe, wherein the compound tank comprises a cylindrical body including a first end, a second end disposed opposite and distal from the first end, an interior having an inner diameter, and a height defined by the distance between the first end and the second end, and wherein the rotary union assembly comprises a first rotary union and a second rotary union.

10. The liner of claim 9 wherein the single probe is a guide pulse level sensor.

11. The liner of claim 9 wherein the inner diameter of compound tank is less than 5.125 inches.

12. The liner of claim 11 wherein the inner diameter of the compound tank is about 2.750 inches.

13. The liner of claim 9 wherein at least one of the first rotary union and the second rotary union is an air rotary union; and wherein the rotary tank assembly further comprises a compressed air assembly including a number of air conduits coupled to the air rotary union.

14. The liner of claim 13 wherein the cylindrical body of the compound tank further includes an exterior having a perimeter, and a plurality of ribs extending radially around the perimeter; wherein the number of air conduits is a plurality of air conduits;

and wherein the ribs are structured to maintain the plurality of air conduits in a spaced radial relationship on the exterior of the cylindrical body.

15. The liner of claim 9 wherein the rotary tank assembly is devoid of any tank insert within the interior of the compound tank.

16. The liner of claim 9 wherein the sensor assembly includes a quick connector for electrically connecting and disconnecting the one single probe.

* * * * *